(12) United States Patent
Kokkinen et al.

(10) Patent No.: US 10,251,069 B1
(45) Date of Patent: Apr. 2, 2019

(54) METHOD AND SYSTEM FOR ALLOCATING FREQUENCY RANGES TO PLURALITY OF NETWORKS

(71) Applicant: Fairspectrum Oy, Espoo (FI)

(72) Inventors: Heikki Kokkinen, Helsinki (FI); Jaakko Ojaniemi, Turku (FI); Arto Kivinen, Turku (FI)

(73) Assignee: FAIRSPECTRUM OY, Espoo (FI)

( * ) Notice: Subject to any disclaimer, the term of this patent is extended or adjusted under 35 U.S.C. 154(b) by 0 days.

(21) Appl. No.: 15/938,328

(22) Filed: Mar. 28, 2018

(51) Int. Cl.
*H04W 16/14* (2009.01)
(52) U.S. Cl.
CPC .................................. *H04W 16/14* (2013.01)
(58) Field of Classification Search
CPC ............................. H04W 16/14; H04W 16/18
See application file for complete search history.

(56) References Cited

U.S. PATENT DOCUMENTS

| | | | |
|---|---|---|---|
| 2009/0191906 A1 | 7/2009 | Abedi | |
| 2014/0128073 A1 | 5/2014 | Farhadi | |
| 2017/0265240 A1* | 9/2017 | Chen | H04W 76/15 |
| 2017/0358848 A1* | 12/2017 | Andujar Linares | H01Q 9/42 |
| 2018/0035279 A1* | 2/2018 | Fujishiro | H04W 8/00 |

FOREIGN PATENT DOCUMENTS

| | | |
|---|---|---|
| EP | 2770789 A1 | 8/2014 |
| WO | 9911078 A1 | 3/1999 |
| WO | 2014086584 A1 | 6/2014 |
| WO | 2015014270 A1 | 2/2015 |

OTHER PUBLICATIONS

Hu et al. "Location Information Assisted Joint Spectrum Sensing and Power Allocation for Cognitive Radio Networks with Primary User Outage Constraint." IEEE Transactions on Vehicular Technology, DOI: 10.1109/TVT.2015.2403951, Feb. 13, 2015, 15 pages.

* cited by examiner

*Primary Examiner* — Diane D Mizrahi
(74) *Attorney, Agent, or Firm* — Ziegler IP Law Group, LLC

(57) ABSTRACT

A method and a system for allocating frequency ranges to a plurality of networks. The method includes defining a geographical area. Moreover, the plurality of networks operate in the defined geographical area. The method further includes identifying first frequency parameters associated with each of the plurality of networks in the defined geographical area; determining second frequency parameters for at least one of the plurality of networks based on an event; and allocating the second frequency parameters to the at least one of the plurality of networks for a predetermined period of time.

10 Claims, 2 Drawing Sheets

METHOD AND SYSTEM FOR ALLOCATING FREQUENCY RANGES TO PLURALITY OF NETWORKS

TECHNICAL FIELD

The present disclosure relates generally to telecommunications; and more specifically, to frequency allocation. Furthermore, the present disclosure relates to methods and systems for allocating frequency ranges to plurality of networks.

BACKGROUND

With the advent of technology, electromagnetic spectrum has enabled transmission of any data or information at a much higher speed and with greater efficiency. Consequently, several vital activities such as broadcast of mass media content via cellular, and satellite networks, infrared communication, Bluetooth communication, microwave radio, ZigBee, Wi-Fi communication and so forth have been facilitated by the electromagnetic spectrum. Moreover, the radio frequency spectrum has increasingly mobilized the use of cellular phones and revolutionized the field of wireless communication.

However, the electromagnetic spectrum is a limited resource. In earlier days, distribution and use of spectrum was relatively easy, owing to a small number of users and fewer uses thereof. However, with an increase in the number of users and uses of the electromagnetic spectrum, a need for effective management of the electromagnetic spectrum has emerged. Typically, mobile networks have high demand for country wide network coverage and data capacity. Mostly, the frequency assignments of mobile, public safety, and military radio networks have their own dedicated frequency bands. The demand of spectrum by the public safety networks and the military networks has increased owing to the increase in digital radio communication. Furthermore, during a crisis situation, such as a natural disaster or a war, public safety networks and the military networks require larger spectrum for their services. Public safety and military have a growing interest to utilize also the mobile frequency bands due to increasing use of video content, which requires larger frequency bands than the voice or small data transfers, and attractiveness to use equipment, which has been developed for mobile use. A scenario, how this could happen is that public safety or military share a frequency band, by allowing the mobile operators to have secondary access on public safety or military bands. The priority order of the possible sharing among mobile, public safety, and military depends, for example, on laws, regulations, and licenses governing a specific frequency band.

The conventional methods for commercial spectrum use are licensed use and license-exempt use. Military and other governmental bodies may have an own way of allocations, which may or may not override the commercial radio licenses, depending on the country. Between licensed and license-exempt use, there might be regulations, where a radio license is required, but protection from interference from other license holders is not guaranteed. The license holders may be required to coordinate the radio spectrum use among themselves or use equipment, which can do it automatically. It is also possible to have an independent radio resource reservation system on such frequency bands. In a majority of cases, a government body allocates spectrum to the plurality of mobile networks through a pre-defined procedure such as auction.

The capacity mobile bands, which are mainly on the frequencies above 2 GHz, practically no operator deploys a nationwide coverage. That leaves a lot of geographic areas, where secondary use would not cause any harmful interference to the mobile operator. On the other hand, public safety and hybrid-war military use is local or regional, and the duration of the use is also relatively short. From this perspective, the use of radio frequencies could be used more efficiently by sharing them between plurality of networks. In the current sharing agreements, the priority order between the plurality of networks is fixed and exceptions to the priority order require at least negotiations and agreements between the parties, and they may require political decisions, law, and regulatory changes. Such processes take a long time compared to the delay tolerated by the PPRD and military missions.

A recent development in spectrum management is Dynamic Spectrum Access (DSA). Current standards and regulations related to DSA include Television White Space, Licensed Shared Access, and Citizen's Broadband Radio Service. Characteristic to these systems is that the information about the use of primary spectrum use is maintained in the system, and the system is able to make changes to the secondary use to ensure that secondary systems do not cause harmful interference to the primary user. DSA systems are automated, and they can react fast, typically in seconds or minutes, to changes. All standardized and regulated DSA systems, so far, have a fixed priority order between the primary and secondary spectrum users.

The criticality of spectrum use by public safety and military communications vary. If the use is related to training, demonstrations, or similar activities, secondary priority might be enough. Public Protection and Disaster Recovery (PPDR) and mission-critical military operations, require the primary priority.

Typically, each of the plurality of network uses the allotted spectrum for their service. Consequently, the allocated spectrum is not used efficiently and optimally by each of the plurality of networks. Traditionally, existing systems contain time based control of spectrum via the spectrum management platform. However, such systems used for spectrum management practices are static in terms of administration, geography, spectrum allocation and so forth. Furthermore, reallocation of frequency parameters is a tedious and difficult process.

Therefore, in light of the foregoing discussion, there exists a need to overcome the aforementioned drawbacks associated with the conventional spectrum management systems. There is a need to have a spectrum sharing system with changing priority order between the plurality of networks. The system should have a possibility for pre-agreed priority changes between the plurality of networks. The changes should be possible to deploy within the time delay that can be tolerated by PPDR and military actions.

SUMMARY

The present disclosure seeks to provide a method for allocating frequency ranges to a plurality of networks. The present disclosure also seeks to provide a system for allocating frequency range to a plurality of networks. The present disclosure seeks to provide a solution to the existing problem of inefficient use of the electromagnetic spectrum and difficulty in reallocation of frequency ranges. An aim of the present disclosure is to provide a solution that overcomes at least partially the problems encountered in prior art, and provides a reliable and optimal method for dynamic allocation of frequency ranges in a plurality of networks.

In one aspect, an embodiment of the present disclosure provides a method for allocating frequency ranges to a plurality of networks, the method comprising
- defining a geographical area, wherein the plurality of networks operate in the defined geographical area;
- identifying first frequency parameters associated with each of the plurality of networks in the defined geographical area, wherein the frequency parameters associated with a network comprise a frequency range and a priority order thereof;
- determining second frequency parameters for at least one of the plurality of networks based on an event; and
- allocating the second frequency parameters to the at least one of the plurality of networks for a predetermined period of time.

In another aspect, an embodiment of the present disclosure provides a system for allocating frequency range to a plurality of networks, the system comprising
- a plurality of servers operable to manage the plurality of networks; and
- a frequency range allocation server communicably coupled to the plurality of server, the frequency range allocation server operable to:
  - define a geographical area, wherein the plurality of networks operate in the defined geographical area;
  - identify first frequency parameters associated with each of the plurality of networks in the defined geographical area, wherein the frequency parameters associated with a network comprise a frequency range and a priority order thereof;
  - determine second frequency parameters for at least one of the plurality of networks based on an event; and
  - allocate the second frequency parameters to the at least one of the plurality of networks for a predetermined period of time.

Embodiments of the present disclosure substantially eliminate or at least partially address the aforementioned problems in the prior art, and enable an effective, optimal, efficient and structured method for allocation of frequency ranges to a plurality of networks.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
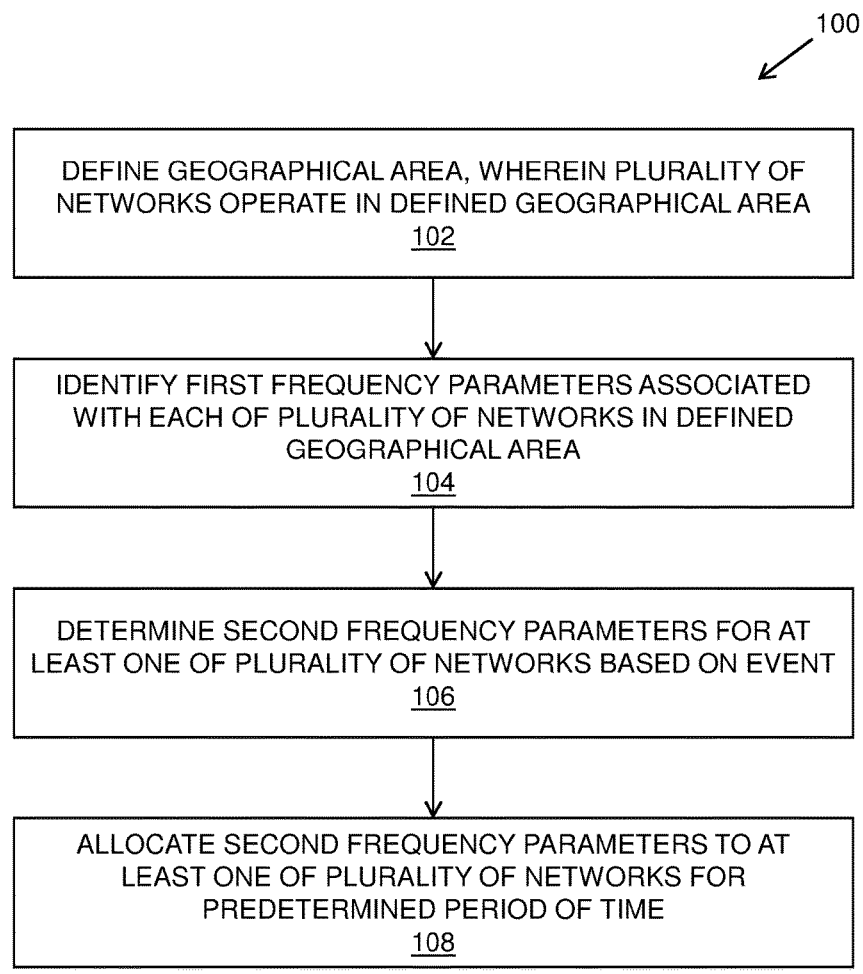
FIG. 1 is illustration of steps of method for allocating frequency ranges to a plurality of networks, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for allocating frequency ranges to a plurality of networks, the method comprising
- defining a geographical area, wherein the plurality of networks operate in the defined geographical area;
- identifying first frequency parameters associated with each of the plurality of networks in the defined geographical area, wherein the frequency parameters associated with a network comprise a frequency range and a priority order thereof;
- determining second frequency parameters for at least one of the plurality of networks based on an event; and
- allocating the second frequency parameters to the at least one of the plurality of networks for a predetermined period of time.

In another aspect, an embodiment of the present disclosure provides a system for allocating frequency range to a plurality of networks, the system comprising
- a plurality of servers operable to manage the plurality of networks; and
- a frequency range allocation server communicably coupled to the plurality of server, the frequency range allocation server operable to:
  - define a geographical area, wherein the plurality of networks operate in the defined geographical area;
  - identify first frequency parameters associated with each of the plurality of networks in the defined geographical area, wherein the frequency parameters associated with a network comprise a frequency range and a priority order thereof;
  - determine second frequency parameters for at least one of the plurality of networks based on an event; and
  - allocate the second frequency parameters to the at least one of the plurality of networks for a predetermined period of time.

The present disclosure provides the aforementioned method and system for allocating frequency ranges to a plurality of networks. The method for allocating frequency ranges enables dynamic allocation of frequency parameters among the plurality of networks based on requirement of operating condition of the plurality of networks in the geographical area. Beneficially, the method facilitates efficient use of electromagnetic spectrum, wherein frequency ranges with a higher priority order is allocated to a network with higher communication requirements. Furthermore, frequency parameters are allocated for a predetermined periods of time allowing enhanced control over operation of the plurality of networks. Additionally, the frequency parameters are determined based on the event in the geographical area allowing tailored operation of the plurality of networks.

Throughout the present disclosure, the term "plurality of networks" relates to radio communication networks comprising one or more mobile transceiver units communicably coupled to a plurality of base transceiver units. Furthermore, a plurality of servers are operable to manage the plurality of networks, wherein the plurality of servers manage the data storage in the plurality of base transceiver units, and communication with the one or more mobile transceiver units. Additionally, the plurality of networks are operable to communicate information wirelessly. Moreover, the plurality of networks relate to all types and combinations of telecommunication services, such as analogue and digital telephone transmissions, high quality sound and image transmission, low-speed asynchronous data transmission and synchronous data transmission, all services in corporation with other types of networks and services. Furthermore, each of the plurality of networks is operable to operate in an allocated frequency range, wherein the frequency range lies in the radio spectrum of range 3 kilohertz to 300 Gigahertz.

The method of allocating frequency ranges to the plurality of networks comprises defining the geographical area. The frequency range allocation server, communicably coupled to the plurality of servers, is operable to define the geographical area. Specifically, defining the geographical area comprises defining boundaries of the geographical area. Moreover, the term "geographical area" relates to an area on surface of the earth, which may be covered by water or land, under consideration for the purposes of the present disclosure. Furthermore, the frequency range allocation server is operable to select a geographical area, wherein the plurality of networks operate in the defined geographical area. Specifically, the plurality of networks comprise at least one mobile transceiver unit thereof in the defined geographical area.

Optionally, a user is operable to define the geographical area using the frequency range allocation server. Furthermore, the user is operable to select the area on a visual representation of the earth's surface (such as, a map) on a user interface coupled with the frequency range allocation server. More optionally, definition of the geographical area (such as, latitudinal and longitudinal coordinates) is preprogrammed in the frequency range allocation server.

Throughout the present disclosure, the term "frequency range allocation server" relates to a computational element operable to regulate and monitor plurality of networks operating in a geographical area. Specifically, the frequency range allocation server is a spectrum manager operable to allocate frequency ranges to the plurality of networks. Furthermore, the frequency range allocation server is operable to allocate a frequency range, previously designated for a given network, to another network. Moreover, the frequency range allocation server may be communicably coupled with a regulatory authority of the geographical area, wherein the regulatory authority is concerned with communication regulations in the geographical area. More specifically, the regulatory authority is concerned with allocation of frequency ranges of radio waves for use in wireless communication. In an example, the regulatory authority may be a national regulatory authority. In another example, when the geographical area is an area inside the country Finland, the regulatory authority may be Finnish Communications Regulatory Authority (FICORA). In yet another example, when the geographical area is an area inside the country United States (US), the regulatory authority may be Federal Communications Commission (FCC). Optionally, the frequency range allocation server comprises interfaces with each of the plurality of networks. In another example, the first geographical area may be the jurisdiction area of the National Regulative Authority (NRA), consisting partially or fully of the country borders.

Optionally, the plurality of networks comprise over-the-air broadcasting networks, mobile networks, public safety networks, and military networks. Specifically, the plurality of networks may communicate over discrete frequency ranges. Furthermore, the mobile networks may include mobile communication networks with 5G and/or Long-Term Evolution (LTE) standard implemented using Self-Organizing Network (SON) and/or Operation, Administration and Maintenance (OAM) protocols. Moreover, public safety networks may include communication networks employed by public safety authorities such as fire control departments, police authorities and so forth. Additionally, the military networks may include specialized, secure networks implemented by the military forces for communication therein. Specifically, the military networks may include networks employed by multiple units of the military such as land, navy, air force and so forth. In an example, the military network for a geographical area in Finland may include VIRVE.

As mentioned previously, the method comprises identifying first frequency parameters associated with each of the plurality of networks in the defined geographical area. The frequency range allocation server is operable to identify first frequency parameters associated with each of the plurality of networks in the defined geographical area. Specifically, each of the plurality networks is analysed to determine first frequency parameters thereof. Alternatively or additionally, first frequency parameters of each of the plurality of networks are stored in a memory unit coupled to the frequency range allocation server, wherein the first frequency parameters are extracted from the memory unit.

Furthermore, the frequency parameters associated with a network comprise a frequency range and a priority order thereof. Specifically, the frequency range of a given network relates to a specific range of frequencies in the radio frequency spectrum allocated to the given network for operation thereof. Moreover, mutual interference of radio signals may occur between two radio transmitters sharing the same frequency range. Consequently, discrete frequency ranges are allocated to different networks. In an implementation, a given frequency range may be shared by one or more networks, wherein the one or more networks may share the frequency range under Licensed Shared Access (LSA) or Citizen's Broadband Radio Service (CBRS). Additionally, each of the plurality of networks comprises a priority order associated therewith. The priority order of a network relates to an order of preference given to the network in comparison to remaining networks sharing the same frequency range. In an implementation, when a frequency range is allocated to a given network, the priority order of the network is one. In another implementation, when a frequency range is shared between a given plurality of networks, each of the network in the given plurality of networks is assigned a priority order. Subsequently, priority order of a given network regulates precedence of traffic of the given network over remaining networks in the plurality of networks.

The method comprises determining second frequency parameters for at least one of the plurality of networks based on an event. The frequency range allocation server is operable to determine second frequency parameters for at least one of the plurality of networks based on an event. Specifically, the second frequency parameters are determined to introduce required operating conditions of the plurality of the networks due to the event.

Optionally, the event is an incidence necessitating a shift from the first frequency parameters associated with the plurality of networks. Specifically, the event may cause a need for different frequency parameters of the at least one of the plurality of networks. Furthermore, the shift from first frequency parameters may be required for public and government convenience.

In a first example, the first frequency parameters are allocated during peaceful routine conditions. Therefore during the peaceful routine conditions, a first frequency parameters may comprise sizable frequency ranges allocated to the mobile networks, wherein the public safety networks and military networks may comprise a Licensed Shared Access. Also, priority order of mobile networks may be higher than that of public safety networks and military networks. In such example, the event may be a natural disaster such as an earthquake or a tsunami. In such example, the need for a shift from first frequency parameters may be necessary. Therefore, the second frequency parameters may comprise a shift of allocation of frequency ranges from mobile networks to the public safety networks. Additionally, a priority order of the public safety networks may be higher than that of mobile networks and military networks.

In a second example, the first frequency parameters are allocated during peaceful routine conditions. Therefore during the peaceful routine conditions, a first frequency parameters may comprise sizable frequency ranges allocated to the mobile networks, wherein the public safety networks and military networks may comprise a Licensed Shared Access. Also, priority order of mobile networks may be higher than that of public safety networks and military networks. In such example, the event may be a wartime. In such example, the need for a shift from first frequency parameters may be necessary. Therefore, the second frequency parameters may comprise a shift of allocation of frequency ranges from mobile networks to the military networks and public safety networks. Additionally, a priority order of the military networks may be higher than that of the public safety networks, and the priority order of mobile networks may be lowest.

Optionally, the second frequency parameters for at least one of the plurality of networks are determined based on an event, wherein the event is forecasted to happen at a future instance. Moreover, the second frequency parameters are pre-determined to be allocated at the future instance. Furthermore, pre-determining second frequency parameters for a forecasted event elevates preparedness of the geographical area.

Optionally, the frequency range allocation server is operable to determine the second frequency parameters based on the event. Subsequently, the frequency range allocation server is operable to develop a frequency parameters profile for the event, wherein the frequency parameters profile is implemented at every occurrence of the event. Furthermore, the frequency range allocation server is operable to develop multiple frequency parameters profiles for multiple categories of event. In an example, a frequency parameter profile "Disaster" may be developed for an event of a natural calamity in the geographical area. In such example, the second frequency parameters may provide frequency ranges with a higher priority order to public safety networks of the geographical area. In another example, a frequency parameter profile "Combat" may be developed for an event of a war in the geographical area. In such example, the second frequency parameters may provide frequency ranges with a higher priority order to military networks.

As mentioned previously, the method comprises allocating the second frequency parameters to the at least one of the plurality of networks for a predetermined period of time. The frequency range allocation server is operable to allocate the second frequency parameters to the at least one of the plurality of networks. The frequency range allocation server is operable to elicit the shift from the first frequency parameters based on the event. Specifically, the second frequency parameters are allocated to elicit the shift from the first frequency parameters. More specifically, the at least one of the plurality of networks is configured to operate based on the second frequency parameters. Furthermore, the second frequency parameters are allocated for a predetermined period of time. Specifically, the predetermined period of time is calculated based on the event. More specifically, the predetermined period of time provides a starting time and an ending time for the allocation of second frequency parameters to the at least one of the plurality of networks.

Optionally, the predetermined period of time is indefinite. Specifically, the predetermined period of time may comprise a starting time. Subsequently, the ending time for the allocation of the second frequency parameters is not provided. Consequently, the second frequency parameters may be allocated to the at least one of the plurality of networks until additional instructions from the frequency range allocation server.

Optionally, the method further comprises selecting an enclosed area within the geographical area. Specifically, the enclosed area within the geographical area requires different operating conditions of the plurality of networks in comparison with the operating conditions of the plurality of networks in the geographical area. Furthermore, the frequency range allocation server is operable to select the enclosed area within the geographical area. Moreover, the plurality of networks comprise at least one mobile transceiver unit thereof in the selected enclosed area.

Optionally, the method further comprises determining third frequency parameters for at least one of the plurality of networks in the enclosed area. Furthermore, the frequency range allocation server is operable to determine the third frequency parameters for at least one of the plurality of networks in the enclosed area. Specifically, the third frequency parameters are determined to provide different operating conditions of the plurality of networks in the enclosed area in comparison with the operating conditions of the plurality of networks in the geographical area.

Optionally, the frequency range allocation server is operable to determine third frequency parameters for at least one of the plurality of networks in the enclosed area based on a subsequent event in the enclosed area. Specifically, the subsequent event in the enclosed area may occur after the event in the geographical area. Optionally, the subsequent event in the enclosed area may occur as a result the event in the geographical area. In an example, the event in the geographical area "District 12" may be war. Therefore, the second frequency parameters for the plurality of networks may comprise providing frequency ranges and with a higher priority order to military networks. Subsequently, an enclosed area "Section 4" within the geographical area "District 12" may comprise a subsequent event of bombing in the enclosed area causing causalities. In such an example, the determined third frequency parameters may comprise providing frequency ranges and with a higher priority order to public safety networks in the enclosed area "Section 4".

Optionally, the method further comprises allocating the third frequency parameters to the at least one of the plurality of networks in the enclosed area for a subsequent predetermined period of time. Specifically, the subsequent predetermined period of time may have a starting time after the starting time of the predetermined period of time for the second frequency parameters. However, the ending time of the subsequent predetermined period of time may be prior or post the ending time of the predetermined period of time.

DETAILED DESCRIPTION OF THE DRAWINGS

Referring to FIG. 1, there is shown an illustration of steps of method 100 for allocating frequency ranges to a plurality of networks, in accordance with an embodiment of the present disclosure. At a step 102, a geographical area is defined. Furthermore, the plurality of networks operates in the defined geographical area. At a step 104, first frequency parameters associated with each of the plurality of networks are identified in the defined geographical area. Moreover, the frequency parameters associated with a network comprise a frequency range and a priority order thereof. At a step 106, second frequency parameters for at least one of the plurality of networks are determined based on an event. At a step 108, the second frequency parameters are allocated to the at least one of the plurality of networks for a predetermined period of time.

The steps 102 to 108 are only illustrative and other alternatives can also be provided where one or more steps are added, one or more steps are removed, or one or more steps are provided in a different sequence without departing from the scope of the claims herein.

Figure 2:
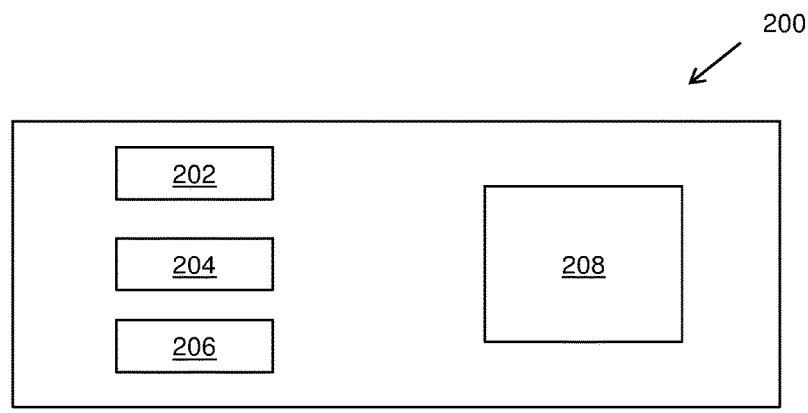
FIG. 2 is a block diagram of system for allocating frequency ranges to a plurality of networks, in accordance with an embodiment of the present disclosure.

Referring to FIG. 2, there is shown a block diagram of system 200 for allocating frequency ranges to a plurality of networks, in accordance with an embodiment of the present disclosure. The system 200 comprises a plurality of servers, such as servers 202, 204, 206, operable to manage a plurality of networks. Furthermore, the system 200 further comprises a frequency range allocation server 208 communicably coupled to the plurality of servers, such as servers 202, 204, 206. The frequency range allocation server 208 is operable to control and regulate frequency parameters of the plurality of networks.

Figure 3:
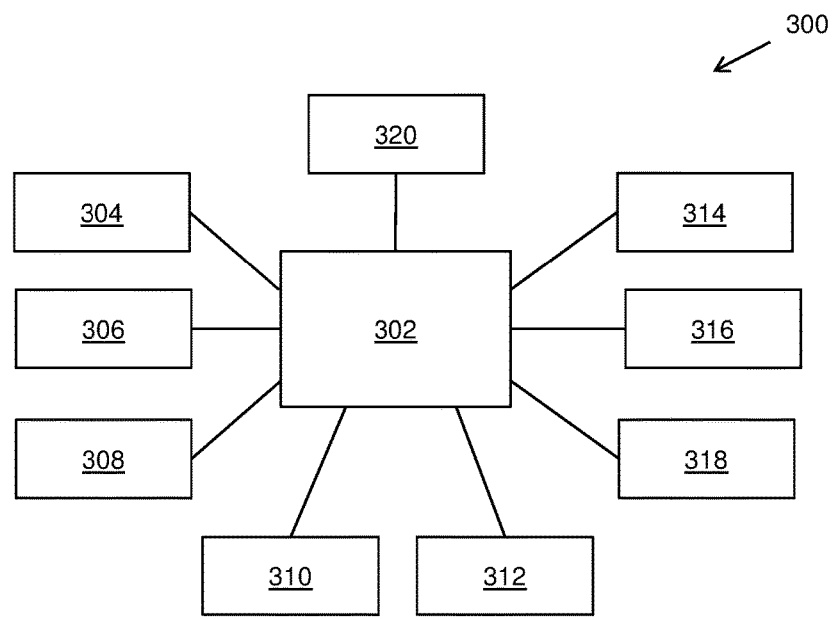
FIG. 3 is a block diagram system for allocating frequency ranges to a plurality of networks, in accordance with an exemplary implementation of the present disclosure.

Referring to FIG. 3, there is shown a block diagram system 300 for allocating frequency ranges to a plurality of networks, in accordance with an exemplary implementation of the present disclosure. The system 300 comprises a frequency range allocation server 302. Furthermore, the frequency range allocation server 302 is communicably coupled to plurality of servers such as server 304 to 318. Specifically, the plurality of servers, such as the servers 304, 306, and 308, are operable to manage military networks. Furthermore, the plurality of servers, such as the servers 310 and 312, are operable to manage public safety networks. Moreover, the plurality of servers, such as the servers 314, 316 and 318, are operable to manage over-the air broadcasting networks and/or mobile networks. In a first example, the servers 304, 306 and 308 operable to manage military networks may comprise of army, air force, and navy. In a second example, the servers 310 and 312 operable to manage public safety networks may comprise of fire brigade, and police. In a third example, the servers 314, 316 and 318 operable to manage over-the air broadcasting networks and/or mobile networks may comprise of mobile service providers, radio, television, self-organizing networks and so forth. Optionally, the frequency range allocation server 302 may be communicably coupled to a regulatory authority 320 of a geographical area. Additionally, the regulatory authority 320 is concerned with communication regulations in the geographical area.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method, in a system for allocating frequency ranges to a plurality of networks, the system including a frequency range allocation server configured to execute the method, the method comprising the frequency range allocation server:
   defining a geographical area, wherein the plurality of networks operate in the defined geographical area;
   identifying first frequency parameters associated with each of the plurality of networks in the defined geographical area, wherein the frequency parameters associated with a network comprise a frequency range and a priority order thereof;
   determining second frequency parameters for at least one of the plurality of networks based on an event; and
   allocating the second frequency parameters to the at least one of the plurality of networks for a predetermined period of time based upon the event, the at least one of the plurality of networks being configured to operate on a frequency range associated with the second frequency parameters based on the event.

2. The method of claim 1, wherein the method further comprises:
   selecting an enclosed area within the geographical area;
   determining third frequency parameters for at least one of the plurality of networks in the enclosed area; and
   allocating the third frequency parameters to the at least one of the plurality of networks in the enclosed area for a subsequent predetermined period of time.

3. The method of claim 2, wherein determining third frequency parameters for at least one of the plurality of networks in the enclosed area is based on a subsequent event in the enclosed area.

4. The method of claim 1, wherein the event is an incidence necessitating a shift from the first frequency parameters associated with the plurality of networks.

5. The method of claim 1, wherein the plurality of networks comprise over-the-air broadcasting networks, mobile networks, public safety networks, and military networks.

6. A system for allocating frequency range to a plurality of networks, the system comprising
   a plurality of servers operable to manage the plurality of networks; and
   a frequency range allocation server communicably coupled to the plurality of server, the frequency range allocation server operable to:

define a geographical area, wherein the plurality of networks operate in the defined geographical area;

identify first frequency parameters associated with each of the plurality of networks in the defined geographical area, wherein the frequency parameters associated with a network comprise a frequency range and a priority order thereof;

determine second frequency parameters for at least one of the plurality of networks based on an event; and allocate the second frequency parameters to the at least one of the plurality of networks for a predetermined period of time based upon the event, the at least one of the plurality of networks being configured to operate on a frequency range associated with the second frequency parameters based upon the event.

7. The system of claim 6, wherein the frequency range allocation server is further operable to:

select an enclosed area within the geographical area;

determine third frequency parameters for at least one of the plurality of networks in the enclosed area; and allocate the third frequency parameters to the at least one of the plurality of networks in the enclosed area for a subsequent predetermined period of time.

8. The system of claim 7, wherein the frequency range allocation server is operable to determine third frequency parameters for at least one of the plurality of networks in the enclosed area based on a subsequent event in the enclosed area.

9. The system of claim 6, wherein the event is an incidence necessitating a shift from the first frequency parameters associated with the plurality of networks.

10. The system of claim 1, wherein the plurality of networks comprise over-the-air broadcasting networks, mobile networks, public safety networks, and military networks.

* * * * *